United States Patent
Mori

(10) Patent No.: US 12,459,502 B2
(45) Date of Patent: Nov. 4, 2025

(54) VEHICLE CONTROL DEVICE

(71) Applicant: TOYOTA JIDOSHA KABUSHIKI KAISHA, Toyota (JP)

(72) Inventor: Hirofumi Mori, Hadano (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 207 days.

(21) Appl. No.: 18/364,668

(22) Filed: Aug. 3, 2023

(65) Prior Publication Data

US 2024/0116499 A1   Apr. 11, 2024

(30) Foreign Application Priority Data

Oct. 6, 2022   (JP) .................................. 2022-161440

(51) Int. Cl.
B60W 30/09   (2012.01)

(52) U.S. Cl.
CPC ......... *B60W 30/09* (2013.01); *B60W 2554/20* (2020.02); *B60W 2554/402* (2020.02); *B60W 2554/802* (2020.02); *B60W 2720/12* (2013.01)

(58) Field of Classification Search
CPC .... B60W 30/09; B60W 30/12; B60W 30/162; B60W 60/001; B60W 60/00274; B60W 2554/20; B60W 2554/402; B60W 2554/4023; B60W 2554/4042; B60W 2554/802; B60W 2720/12; B60W 2754/20; G08G 1/16

See application file for complete search history.

(56) References Cited

U.S. PATENT DOCUMENTS

| | | | |
|---|---|---|---|
| 7,692,534 B2 | 4/2010 | Kataoka et al. | |
| 8,352,124 B2 | 1/2013 | Taguchi | |
| 8,682,500 B2 | 3/2014 | Sakugawa | |
| 8,818,634 B2 | 8/2014 | Fujita et al. | |
| 9,168,953 B2 | 10/2015 | Mitsumoto et al. | |
| 9,714,034 B2 | 7/2017 | Otake et al. | |
| 9,880,558 B2 | 1/2018 | Nakamura | |
| 9,902,399 B2 | 2/2018 | Torii et al. | |
| 10,345,443 B2 | 7/2019 | Masui et al. | |
| 10,611,240 B2 | 4/2020 | Masui et al. | |
| 11,738,743 B2 * | 8/2023 | Pandy | B60W 30/12 701/26 |
| 2014/0043166 A1 * | 2/2014 | Sasaki | G08B 21/02 340/576 |
| 2017/0151982 A1 * | 6/2017 | Fujii | G06V 20/588 |

(Continued)

FOREIGN PATENT DOCUMENTS

| | | |
|---|---|---|
| JP | 2003-029841 A | 1/2003 |
| WO | 2019/058465 A1 | 3/2019 |

*Primary Examiner* — Peter D Nolan
*Assistant Examiner* — Ce Li Li
(74) *Attorney, Agent, or Firm* — SoraIP, Inc.

(57) ABSTRACT

The vehicle control device is a vehicle control device that executes autopilot control of a vehicle for securing a lateral distance between an object 8 existing within a predetermined distance from the driving lane and in front of the vehicle outside the driving lane of the vehicle that is the autonomous vehicle. The vehicle control device includes a type determination unit that determines a type of an object based on a detected result of a front sensor mounted on the vehicle, and a driving control unit that changes a target lateral speed in the autopilot control according to the type of the object.

6 Claims, 6 Drawing Sheets

(56) References Cited

U.S. PATENT DOCUMENTS

| | | | |
|---|---|---|---|
| 2018/0065626 A1* | 3/2018 | Reckziegel | B60W 30/09 |
| 2020/0198634 A1* | 6/2020 | Yashiro | G08G 1/16 |
| 2021/0339748 A1* | 11/2021 | Spieker | B60W 60/00272 |
| 2022/0283587 A1* | 9/2022 | Kabzan | B60W 30/09 |

* cited by examiner

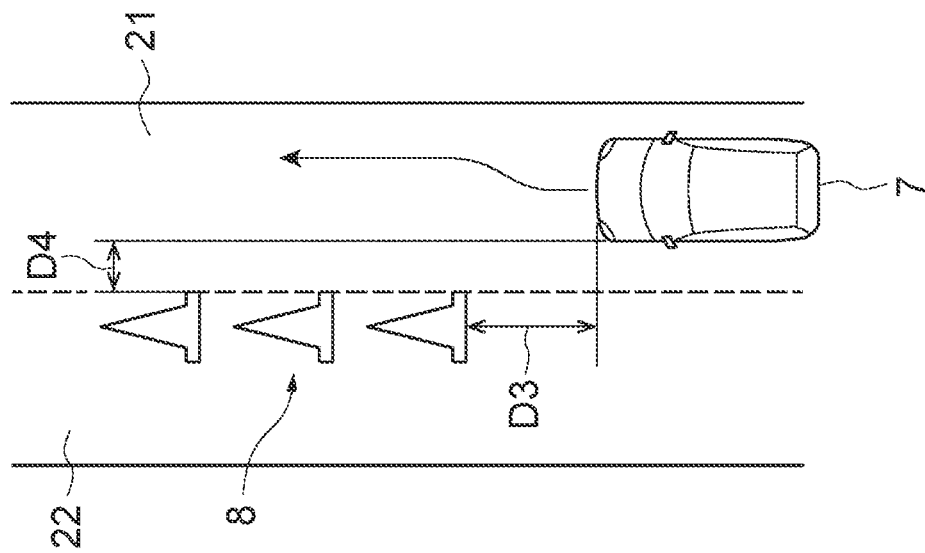
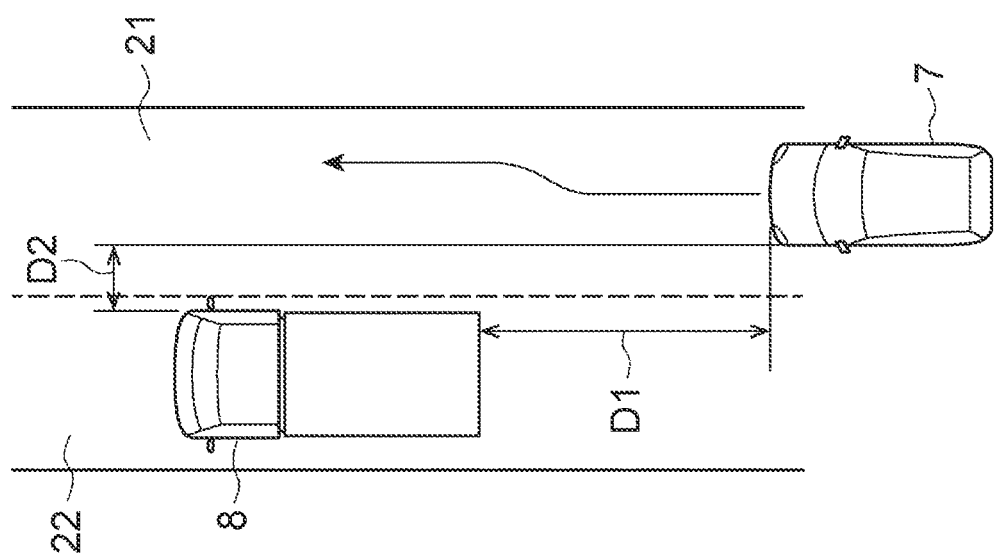

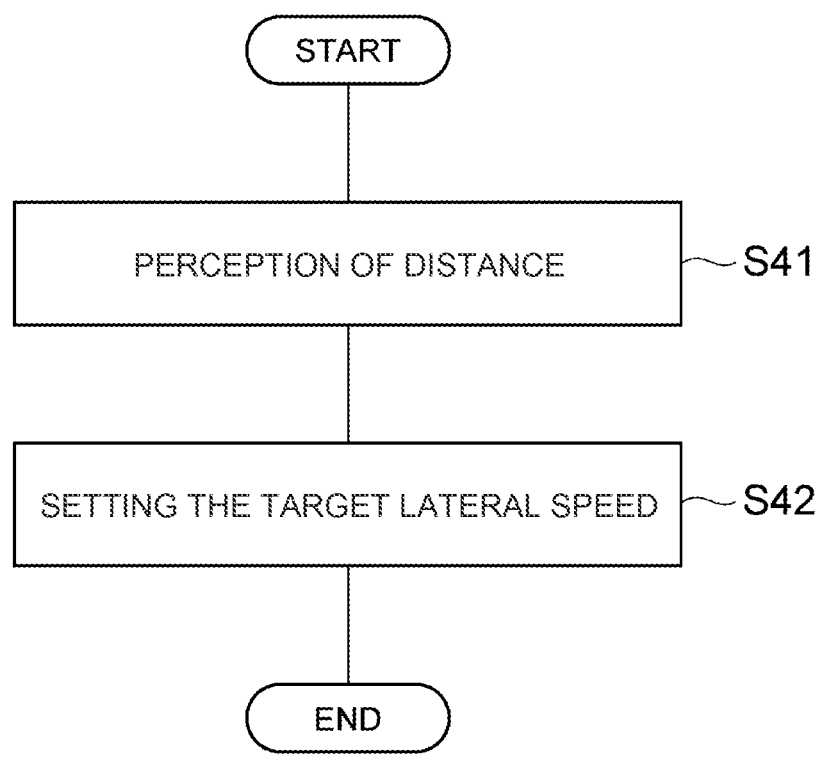

VEHICLE CONTROL DEVICE

CROSS-REFERENCE TO RELATED APPLICATION

This application claims priority to Japanese Patent Application No. 2022-161440 filed on Oct. 6, 2022, incorporated herein by reference in its entirety.

BACKGROUND

1. Technical Field

The present disclosure relates to a vehicle control device.

2. Description of Related Art

Conventionally, Japanese Unexamined Patent Application Publication No. 2003-29841 (JP 2003-29841 A) is known as a technical document related to a vehicle control device. This publication discloses a technique of alleviating a sense of anxiety of an occupant by controlling a moving speed to a target lane position in accordance with a vehicle speed of an own vehicle when the own vehicle moves to the target lane position.

SUMMARY

In such a vehicle control device, there is a case where autopilot control is executed to take a lateral distance from an object present within a predetermined distance from a driving lane and in front of the vehicle outside the driving lane of the vehicle. Even in execution of the autopilot control, there is a demand for further improvement to alleviate the sense of anxiety of the occupant.

An object of the present disclosure is to provide a vehicle control device capable of alleviating a sense of anxiety of an occupant in autopilot control.

A vehicle control device according to an aspect of the present disclosure is a vehicle control device that executes autopilot control of a vehicle for securing a lateral distance between the vehicle and an object present within a predetermined distance from a driving lane and in front of the vehicle outside the driving lane of the vehicle, and includes: a type determination unit that determines a type of the object based on a detected result of a front sensor mounted on the vehicle; and a driving control unit that changes a target lateral speed in the autopilot control in accordance with the type of the object.

The vehicle control device further includes a distance recognizing unit that recognizes a distance between the object and the vehicle in a front-rear direction of the vehicle based on the detected result of the front sensor. The driving control unit executes the autopilot control along a target lateral speed pattern in which the target lateral speed increases as the distance decreases, and the target lateral speed pattern is different for each type of object.

According to the present disclosure, it is possible to provide a vehicle control device capable of alleviating a sense of anxiety of an occupant in autopilot control.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2A is a diagram for explaining an autopilot control according to a type of an object;

FIG. 2B is a diagram for explaining an autopilot control according to a type of an object;

FIG. 6 is a flow chart illustrating VLO control.

DETAILED DESCRIPTION OF EMBODIMENTS

Hereinafter, embodiments of the present disclosure will be described with reference to the drawings.

Figure 1:
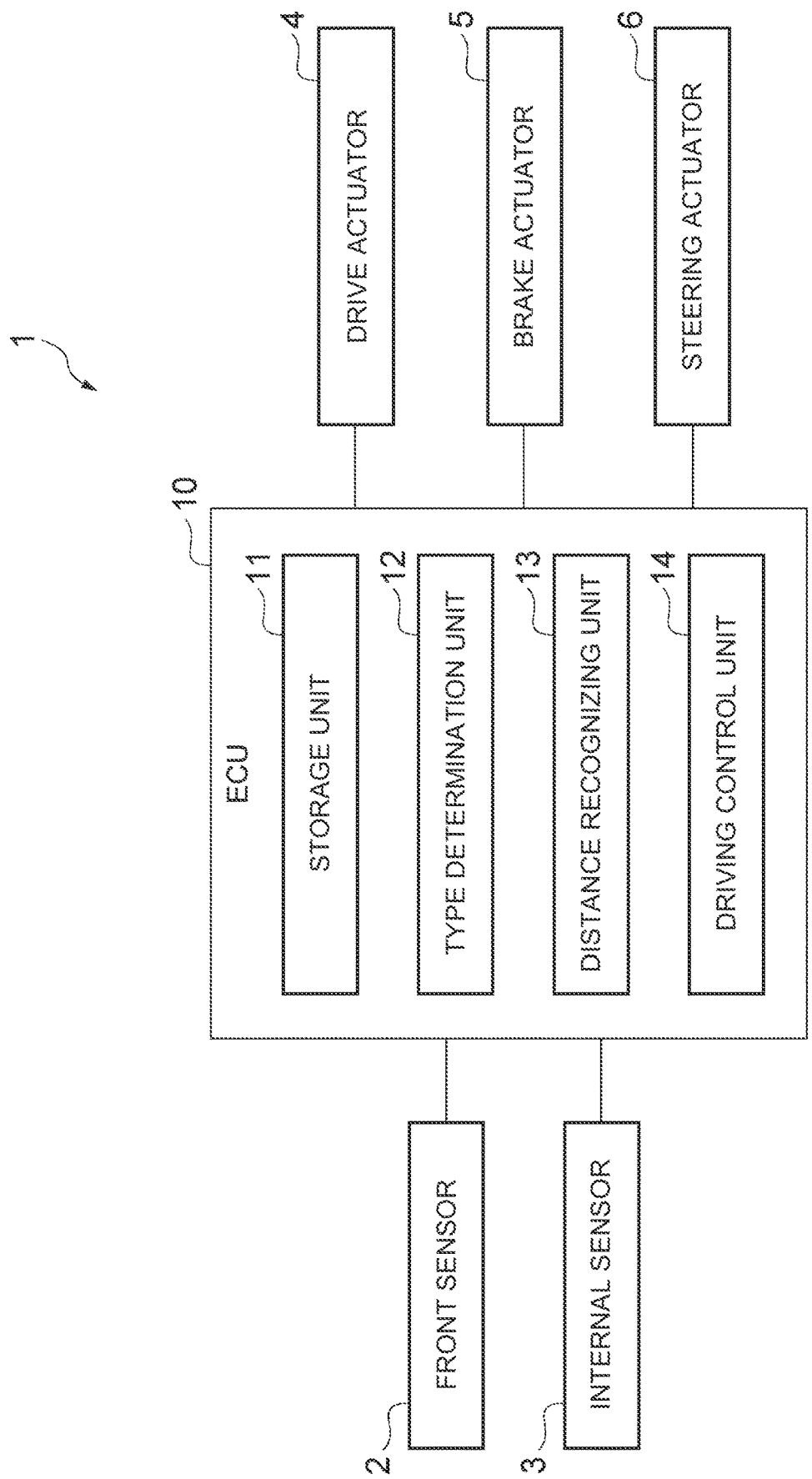
FIG. 1 is a block diagram illustrating a vehicle control device according to an embodiment.

FIG. 1 is a block diagram illustrating a vehicle control device 1 according to an embodiment. As illustrated in FIG. 1, the vehicle control device 1 includes a front sensor 2, an internal sensor 3, a drive actuator 4, a brake actuator 5, a steering actuator 6, and an Electronic Control Unit (ECU) 10. The vehicle control device 1 controls the traveling of a vehicle 7 (refer to FIGS. 2A, 2B) which is an autonomous vehicle.

The front sensor 2 is configured to include at least one of a camera and a radar sensor. The camera is an imaging device that captures an image of the outside of the vehicle 7. ECU 10 may be configured to transmit the captured images. An object around the vehicle 7 is detected by image recognition processing on the captured image of the camera. The camera may be a monocular camera or a stereo camera.

The radar sensor is a detection device that detects an object around the vehicle 7 using radio waves (for example, millimeter waves) or light. The radar sensor includes a millimeter-wave radar or Light Detection and Ranging (LIDAR). The radar sensor transmits radio waves or light to the surroundings of the vehicle 7, and detects the object by receiving the radio waves or light reflected by the object. The radar sensor transmits the detected object to ECU 10.

The internal sensor 3 is a detection device that detects a traveling state of the vehicle 7. The internal sensor 3 includes, for example, a vehicle speed sensor, an acceleration sensor, a yaw rate sensor, and the like. The vehicle speed sensor is a detector that detects the speed of the vehicle 7. As the vehicle speed sensor, for example, a wheel speed sensor is used. The acceleration sensor is a detector that detects acceleration of the vehicle 7. The acceleration sensor may include a longitudinal acceleration sensor that detects acceleration in a front-rear direction of the vehicle 7 and a lateral acceleration sensor that detects acceleration in the lateral direction of the vehicle 7. The yaw rate sensor is a detector that detects a yaw rate (rotational angular speed) around the vertical axis of the center of gravity of the vehicle 7. As the yaw rate sensor, for example, a gyro sensor can be used. The internal sensor 3 transmits the driving condition of the vehicles 7 to ECU 10.

The drive actuator 4 controls the driving force of the vehicles 7 in response to a control signal from ECU 10. Specifically, the drive actuator 4 controls the amount of air supplied to the engine (throttle opening degree) and controls the driving force of the vehicle 7. When the vehicle 7 is in hybrid electric vehicle (HEV state, a control signal from ECU 10 is inputted to a motor as a power source in addition to the air-supply amount to the engine, and the driving force is controlled. When the vehicles 7 are battery electric vehicle (BEV), a control signal from ECU 10 is inputted to a motor serving as a power source, and the driving force is controlled. The motor serving as a power source in these cases constitutes the drive actuator 4.

The brake actuator 5 controls the braking force of the vehicle 7 in response to a control signal from ECU 10. Specifically, the brake actuator 5 controls the brake system in response to a control signal from ECU 10, and controls the braking force applied to the wheels of the vehicles 7. As the brake system, for example, a hydraulic brake system can be used.

The steering actuator 6 controls the steering torque of the vehicle 7 in response to a control signal from ECU 10. Specifically, the steering actuator 6 controls the driving of the assist motor that controls the steering torque in the electric power steering system in response to a control signal from ECU 10.

ECU 10 is an electronic control unit having Central Processing Unit (CPU) and a storage device such as Read Only Memory (ROM) or Random Access Memory (RAM). In ECU 10, for example, various functions are realized by executing a program stored in a storage device by a CPU. ECU 10 is provided, for example, in the vehicles 7.

The vehicle control device 1 executes autopilot control of the vehicle 7. In the present embodiment, the autopilot control is Vehicle Lateral Offset (VOL). VLO control is a control for securing a lateral distance between the vehicle 7 and an object present in a predetermined distance from the driving lane outside the driving lane of the vehicle 7 and in front of the vehicle. VLO control is a control for securing a lateral distance between an object adjoining the vehicle 7 and the vehicle 7.

FIGS. 2A, 2B each are a diagram for explaining VLO control according to a type of an object. As shown in FIGS. 2A, for example, a large moving body (for example, a large vehicle) may be present as the object 8 in the driving lane 22 adjoining the driving lane 21 of the vehicle 7 and in front of the vehicle 7. On the other hand, as shown in FIG. 2B, for example, a small stationary object (for example, a pylon for construction work) may be present as the object 8 in the driving lane 22 and in front of the vehicles 7. In VLO control, the vehicle 7 is caused to travel such that the lateral distances D2, D4 between the object 8 and the vehicle 7 increase. In VLO control, when the types of the objects 8 are different, the vehicles 7 are caused to travel along different patterns for each type of the objects 8. Specifically, it is as follows.

As illustrated in FIG. 1, ECU 10 includes a storage unit 11, a type determination unit 12, a distance recognizing unit 13, and a driving control unit 14 as a functional configuration. The storage unit 11 stores a target lateral speed pattern corresponding to each object 8. The target lateral speed pattern will be described later. The storage unit 11 may store the target lateral speed pattern in a data base outside ECU 10.

The type determination unit 12 determines the type of the object 8 based on the detected result of the front sensor 2 mounted on the vehicle 7. The type determination unit 12 determines the type of the object 8 based on the captured image of the camera of the front sensor 2. The type determination unit 12 determines the type of the object 8 using, for example, at least one of noise removal, edge processing, pattern matching, and deep learning with respect to the captured image. The type determination unit 12 may determine the type of the object 8 based on the detected result of the radar sensor of the front sensor 2.

The type determination unit 12 determines the movement state of the object 8 based on the detected result of the front sensor 2. The type determination unit 12 determines whether or not the object 8 is a moving object and whether or not the object 8 is a stationary object. The type determination unit 12 determines the size of the object 8 based on the detected result of the front sensor 2. The type determination unit 12 determines whether or not the object 8 is a large object and whether or not the object 8 is a small object.

Examples of the type of the object 8 include a large moving object, a large stationary object, a small moving object, and a small stationary object. Examples of the large moving object include a large vehicle (for example, a truck) and a construction vehicle. Examples of the large stationary body include a wall and a fence. Examples of the small mobile object include a pedestrian and a bicycle. Examples of the small stationary body include a pylon for construction, a signboard (for example, an arrow board), a block, and a small barrier.

The distance recognizing unit 13 recognizes distances D1, D3 between the object 8 and the vehicle 7 in the front-rear direction of the vehicle 7 based on the detected result of the front sensor 2. The distance recognizing unit 13 may recognize the distances D1, D3 based on the captured image of the camera of the front sensor 2 or the detected result of the radar sensor.

When the object 8 is present in front of the vehicle 7, the driving control unit 14 controls the travel of the vehicle 7 so that the lateral distances D2, D4 between the vehicle 7 and the object 8 increase. The driving control unit 14 controls the travel of the vehicle 7 so that the vehicle 7 moves away from the object 8 in the lateral direction. The driving control unit 14 controls the travel of the vehicle 7 so that the vehicle 7 moves to the target position in the lateral direction at a predetermined lateral speed. The driving control unit 14 controls the lateral speed of the vehicle 7 by, for example, transmitting a signal related to the steering angle of the vehicle 7 to the steering actuator 6. The driving control unit 14 changes the target lateral speed in VLO control of the vehicles 7 according to the type of the object 8.

The driving control unit 14 performs VLO control along the target lateral speed pattern. The target lateral speed pattern is a temporal variation pattern of the target lateral speed of the vehicles 7 in VLO control. As the target lateral speed pattern, different patterns may be prepared in advance according to the type of the object 8. The driving control unit 14 executes VLO control according to a target lateral speed pattern that is different for each type of the object 8. For example, the target lateral speed pattern when the object 8 is a moving object is different from the target lateral speed pattern when the object 8 is a stationary object. For example, the target lateral speed pattern when the object 8 is a large object is different from the target lateral speed pattern when the object 8 is a small object.

Figure 3:
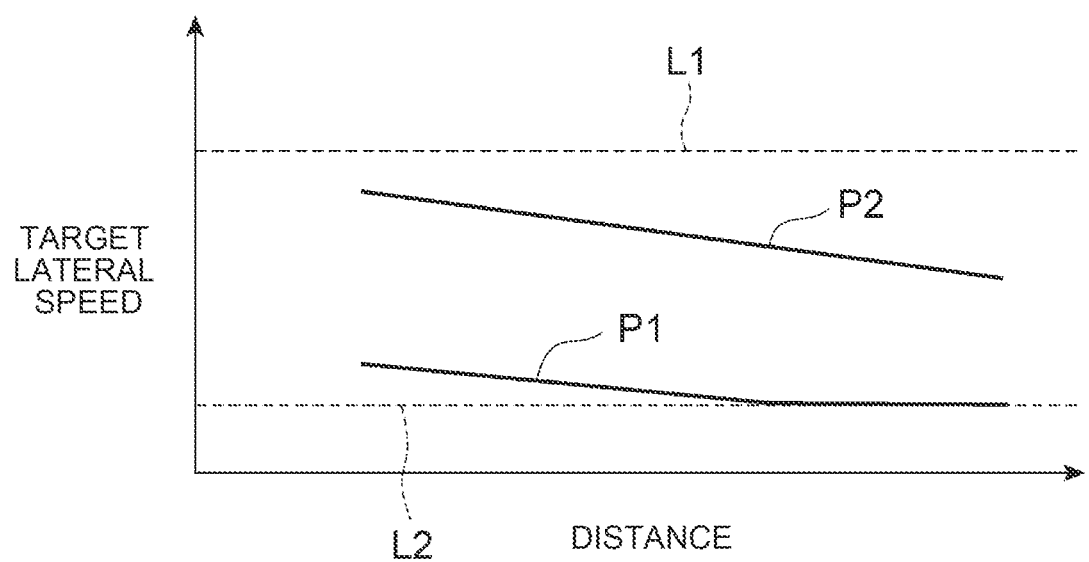
FIG. 3 is a diagram illustrating a target lateral speed pattern corresponding to a type of an object.

FIG. 3 is a diagram illustrating a target lateral speed pattern corresponding to the type of the object 8. FIG. 3 shows, by way of example, a target lateral speed pattern P1 corresponding to a large moving object (for example, a large-sized vehicle) and a target lateral speed pattern P2 corresponding to a small stationary object (for example, a pylon for construction). When the object 8 is a large moving object, the driving control unit 14 executes VLO control along the target lateral speed pattern P1. In the target lateral speed pattern P1, the target lateral speed increases as the distance D1 decreases. When the object 8 is a small stationary object, the driving control unit 14 executes VLO control along the target lateral speed pattern P2. In the target lateral speed pattern P2, the target lateral speed increases as the range D3 decreases.

The driving control unit 14 increases the target lateral speed as the timing at which the object 8 is detected by the front sensor 2 is slower. The timing at which the object 8 is detected by the front sensor 2 may or may not coincide with the timing at which VLO control is started. In addition, in the present embodiment, when the distances are equal, the target lateral speed in the target lateral speed pattern P1 is smaller than the target lateral speed in the target lateral speed pattern P2. The target lateral speed patterns P1, P2 are set between the upper limit lateral speed L1 and the lower limit lateral speed L2.

Figure 4:
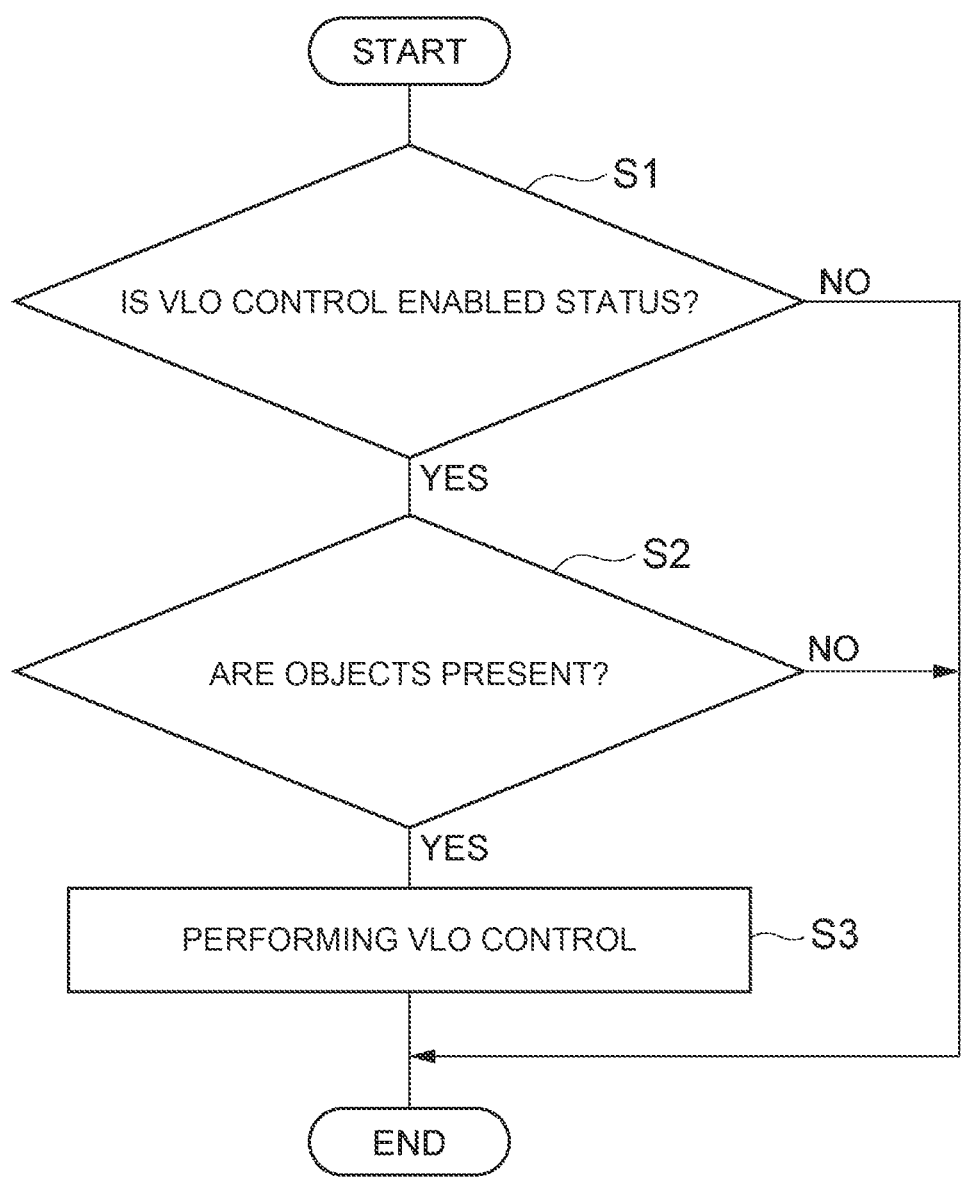
FIG. 4 is a flowchart illustrating a process performed by the vehicle control device.

Next, ECU 10 process will be described. FIG. 4 is a flow chart illustrating a process performed by ECU 10. As shown in FIG. 4, ECU 10 determines in S1 whether or not the vehicles 7 are permitted for VLO control. When it is determined that the vehicles 7 are permitted to perform VLO control (S1: YES), ECU 10 proceeds to S2. When it is determined that the vehicles 7 are not permitted to perform VLO control (S1: NO), ECU 10 ends the present process. In S2, ECU 10 determines whether or not the object 8 is present in front of the vehicles 7. When it is determined that the object 8 is present in front of the vehicles 7 (S2: YES), ECU 10 proceeds to S3. When it is determined that the object 8 does not exist in front of the vehicles 7 (S2: NO), ECU 10 ends the present process. ECU 10 executes VLO control of the vehicles 7 in S3.

Figure 5:
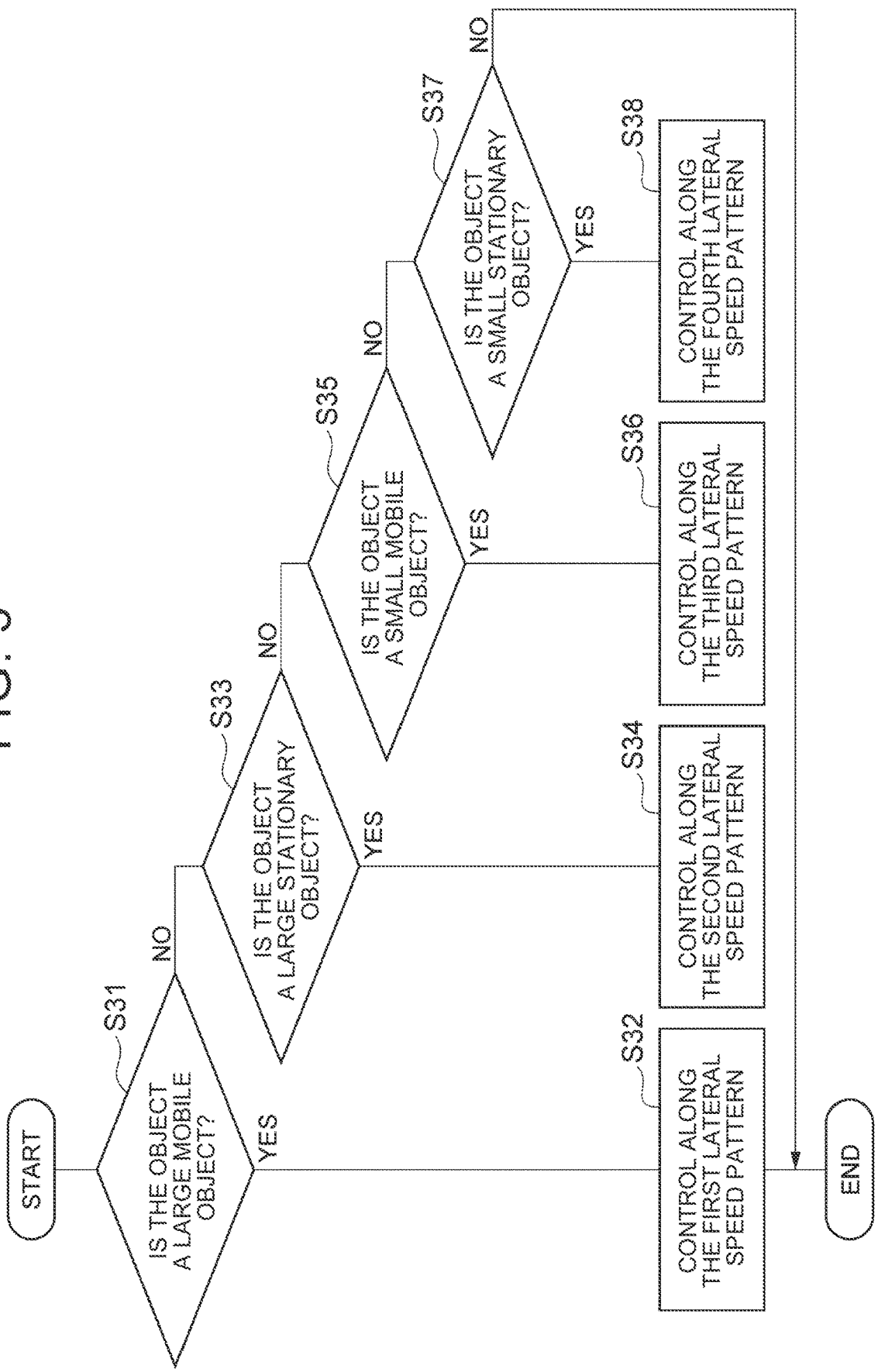
FIG. 5 is a flow chart illustrating VLO control.

FIG. 5 is a flow chart showing VLO control of the vehicles 7. As shown in FIG. 5, VLO control is executed along the first lateral speed pattern, the second lateral speed pattern, the third lateral speed pattern, or the fourth lateral speed pattern according to the type of the object 8. Each of the first lateral speed pattern, the second lateral speed pattern, the third lateral speed pattern, and the fourth lateral speed pattern is stored in the storage unit 11 as a different pattern. ECU 10 determines whether or not the object 8 is a large moving object in S31. ECU 10 transitions to S32 when the object 8 is a large mobile object (S31: YES). ECU 10 transitions to S33 if the object 8 is not a large mobile object (S31: NO). ECU 10 performs VLO control in S32 along a first lateral speed pattern (e.g., the target lateral speed pattern P1 shown in FIGS. 2A, 2B).

ECU 10 determines whether or not the object 8 is a large stationary object in S33. ECU 10 transitions to S34 if the object 8 is a large stationary object (S33: YES). ECU 10 transitions to S35 if the object 8 is not a large stationary object (S33: NO). ECU 10 performs VLO control along the second lateral speed pattern in S34. When the distance between the object 8 and the vehicle 7 in the front-rear direction of the vehicle 7 is the same, the lateral speed in the second lateral speed pattern is smaller than the lateral speed in the first lateral speed pattern. That is, when the object 8 is a large stationary object, ECU 10 causes the vehicles 7 to travel at a larger lateral speed than when the object 8 is a large moving object.

ECU 10 determines, in S35, whether the object 8 is a small mobile object. ECU 10 transitions to S36 when the object 8 is a small mobile object (S35: YES). ECU 10 transitions to S37 if the object 8 is not a small mobile (S35: NO). ECU 10 performs VLO control along the third lateral speed pattern in S36.

ECU 10 determines whether or not the object 8 is a small stationary object in S37. ECU 10 transitions to S38 if the object 8 is a small stationary object (S37: YES). When the object 8 is not a small stationary object (S37: NO), ECU 10 ends the present process. ECU 10 performs VLO control along a fourth lateral speed pattern (e.g., the target lateral speed pattern P3 shown in FIG. 2) in S38.

FIG. 6 is a flow chart illustrating VLO control along the respective target lateral speed patterns. As shown in FIG. 6, ECU 10 recognizes the distance between the object 8 and the vehicle 7 in the front-rear direction of the vehicle 7 in S41. ECU 10 sets the target lateral speed based on the target lateral speed pattern and the distance in the step S42. ECU 10 causes the vehicles 7 to travel at a set target lateral speed.

As described above, in the vehicle control device 1 of the present embodiment, the driving control unit 14 changes the target lateral speed in VLO control according to the type of the object 8. As a result, the vehicle 7 can be caused to travel at a different target lateral speed for each type of the object 8. Therefore, in the vehicle control device 1, it is possible to realize VLO control close to the manual driving by the driver as compared with the case where VLO control is executed at a constant target lateral speed regardless of the type of the object 8, and thus it is possible to alleviate the anxiety of the occupant. Conventionally, depending on the accuracy of detecting the object 8 by the front sensor 2, the type of the object 8, and the like, the occupant may feel that VLO control is relatively slow. According to the vehicle control device 1 of the present embodiment, even when there is an object 8 or the like which is difficult to be detected as not close or an object 8 or an occupant wishes to avoid prematurely, by setting in advance so that an appropriate target lateral speed, it is possible to alleviate the anxiety of the occupant.

The vehicle control device 1 includes a distance recognizing unit 13 that recognizes a distance between the object 8 and the vehicle 7 in the front-rear direction of the vehicle 7 based on a detected result of the front sensor 2. The driving control unit 14 executes VLO control along the target lateral speed pattern in which the target lateral speed increases as the distance decreases. The target lateral speed pattern is different for each type of the object 8. The smaller the distance between the object 8 and the vehicle 7 in the front-rear direction of the vehicle 7, the more the occupant's anxiety tends to be. According to the above configuration, since the target lateral speed is larger as the distance is smaller, it is possible to secure the distance from the object 8 in a short time, and it is possible to alleviate the anxiety of the occupant.

The type determination unit 12 determines the movement state of the object 8 based on the detected result of the front sensor 2. The target lateral speed pattern when the object 8 is a moving object is different from the target lateral speed pattern when the object 8 is a stationary object. Thus, when the object 8 is a moving object, it is possible to realize VLO control along the target lateral speed pattern which differs from the case where the object 8 is a stationary object. Therefore, it is possible to realize VLO control close to the manual driving by the driver as compared with the case where VLO control is performed with the same target lateral speed pattern even if the object 8 is a moving object or a stationary object, and thus it is possible to alleviate the anxiety of the occupant.

The type determination unit 12 determines the size of the object 8 based on the detected result of the front sensor 2. The target lateral speed pattern in the case where the object 8 is a large object is different from the target lateral speed pattern in the case where the object 8 is a small object. Thus, when the object 8 is a large object, it is possible to realize VLO control along the target lateral speed pattern which differs from the case where the object 8 is a small object. Therefore, it is possible to realize VLO control close to the manual driving by the driver as compared with the case where VLO control is performed with the same target lateral speed pattern even if the object 8 is a large object or a small object, and thus it is possible to alleviate the anxiety of the occupant.

Although the embodiments of the present disclosure have been described above, the present disclosure is not limited to the above-described embodiments. The present disclosure may be embodied in various forms with various changes and modifications, including the above-described embodiments, based on the knowledge of those skilled in the art.

As the type of the object 8, a large moving body, a large stationary body, a small moving body, a small stationary body, or the like has been exemplified, but the type of the object 8 may be various other types classified based on the magnitude of the anxiety of the occupant. The type of the object 8 may include only one object. For example, the large moving body may include only a large vehicle, and the small stationary body may include only a pylon for construction. The type determination unit 12 does not necessarily need to determine the movement state of the object 8. The type determination unit 12 does not necessarily need to determine the size of the object 8. The type determination unit 12 may only determine the type of the vehicle (including both the stopped vehicle and the traveling vehicle), the structure, and the like.

For example, when the object 8 is a large-sized vehicle, the driving control unit 14 may execute VLO control along a target lateral speed pattern that differs from the case where the object 8 is a construction vehicle.

For example, when the object 8 is a wall, the driving control unit 14 may execute VLO control along a target lateral speed pattern that differs from the case where the object 8 is a fence. For example, when the object 8 is a pedestrian, the driving control unit 14 may execute VLO control along a target lateral speed pattern that differs from the case where the object 8 is a bicycle. For example, when the object 8 is a pylon for construction, the driving control unit 14 may execute VLO control along a target lateral speed pattern that differs from the case where the object 8 is a signboard. The driving control unit 14 may control the travel of the vehicle 7 at a predetermined target lateral speed determined in advance corresponding to various types of the object 8.

The target lateral speed of the vehicle 7 in the case where the object 8 is a moving body may be larger than the target lateral speed of the vehicle 7 in the case where the object 8 is a stationary body. The target lateral speed of the vehicle 7 in the case where the object 8 is a large object may be greater than the target lateral speed of the vehicle 7 in the case where the object 8 is a small object.

The vehicle control device 1 may not include the distance recognizing unit 13. The driving control unit 14 may change the target lateral speed in VLO control when the type of the object 8 differs regardless of the distance of the vehicle 7 in the front-rear direction.

The driving control unit 14 may determine whether or not the vehicle 7 is traveling at the target lateral speed based on the detected result of the internal sensor 3. When it is determined that the vehicle 7 is not traveling at the target lateral speed, the driving control unit 14 may continue to control the travel of the vehicle 7 until the vehicle 7 travels at the target lateral speed.

What is claimed is:

1. A vehicle control device that executes autopilot control of a vehicle for securing a lateral distance between the vehicle and an object present within a predetermined distance from a driving lane and in front of the vehicle outside the driving lane of the vehicle, the vehicle control device comprising a processor configured to:
   receive a detected result of a front sensor mounted on the vehicle;
   determine a type of the object based on the detected result;
   determine a target lateral speed pattern based on the determined type of the object;
   recognize a distance between the object and the vehicle in a front-rear direction of the vehicle based on the detected result of the front sensor;
   set a target lateral speed based on the determined target lateral speed pattern and the recognized distance; and
   perform the autopilot control of the vehicle such that the vehicle travels at the set target lateral speed wherein:
   the target lateral speed pattern increases as the distance decreases; and
   the target lateral speed pattern is different for each type of object.

2. The vehicle control device according to claim 1, wherein:
   the processor is configured to determine a moving state of the object based on the detected result of the front sensor; and
   the target lateral speed pattern when the object is a moving object is different from the target lateral speed pattern when the object is a stationary object.

3. The vehicle control device according to claim 1, wherein:
   the processor is configured to determine a size of the object based on the detected result of the front sensor; and
   the target lateral speed pattern when the object is a large-sized object is different from the target lateral speed pattern when the object is a small-sized object.

4. The vehicle control device according to claim 1, further comprising a memory configured to store the target lateral speed pattern corresponding to each type of object wherein:
   the type of object includes a large moving object; and
   the target lateral speed pattern includes a first lateral speed pattern corresponding to the large moving object.

5. The vehicle control device according to claim 4, wherein:
   the type of object further includes a large stationary object, and a small moving object; and
   the target lateral speed pattern further includes a second lateral speed pattern corresponding to the large stationary object, and a third lateral speed pattern corresponding to the small moving object.

6. The vehicle control device according to claim 5, wherein:
   the type of object further includes a small stationary object;
   the target lateral speed pattern further includes a fourth lateral speed pattern corresponding to the small stationary object;
   the target lateral speed of the fourth lateral speed pattern is larger than the target lateral speed of the first lateral speed pattern in a case where the distance between the object and the vehicle is the same; and
   the target lateral speed increases in an order of the first lateral speed pattern, the second lateral speed pattern, the third lateral speed pattern, the fourth lateral speed pattern in a case where the distance between the object and the vehicle is the same.

* * * * *